United States Patent [19]

Ishibashi et al.

[11] Patent Number: 4,603,548
[45] Date of Patent: Aug. 5, 1986

[54] METHOD OF SUPPLYING FUEL INTO GAS TURBINE COMBUSTOR

[75] Inventors: Yoji Ishibashi; Isao Sato, both of Hitachi; Fumio Kato, Toukai; Takashi Ohmori; Noriyuki Hayashi, both of Hitachi, all of Japan

[73] Assignee: Hitachi, Ltd., Tokyo, Japan

[21] Appl. No.: 647,658

[22] Filed: Sep. 6, 1984

[30] Foreign Application Priority Data

Sep. 8, 1983 [JP] Japan .................................. 58-164164

[51] Int. Cl.⁴ .............................................. F02C 9/00
[52] U.S. Cl. ...................................... 60/39.06; 60/746
[58] Field of Search ................... 60/39.06, 733, 737, 60/738, 739, 746, 747

[56] References Cited

U.S. PATENT DOCUMENTS

| | | | |
|---|---|---|---|
| 4,112,676 | 9/1978 | De Corso | 60/746 |
| 4,193,260 | 3/1980 | Carlisle et al. | 60/746 |
| 4,292,801 | 10/1981 | Wilkes et al. | 60/39.06 |
| 4,420,920 | 12/1983 | Jorgensen et al. | 60/39.06 |

FOREIGN PATENT DOCUMENTS 1489339 10/1977 United Kingdom ............... 60/733

Primary Examiner—Louis J. Casaregola
Attorney, Agent, or Firm—Antonelli, Terry & Wands

[57] ABSTRACT

A fuel supply method for a gas turbine combustor having first and second stage combustion chambers. The method comprises supplying the fuel from only first stage fuel supply from the start of the gas turbine until its low output range so as to operate only the first stage combustion chamber, supplying the fuel from both first and second stage fuel supply in a high output range of the gas turbine including its maximum output so as to operate both first and second stage combustion chambers. The method makes it possible to reduce $NO_x$ without deteriorating the combustion performance by stepwise supplying a predetermined flow rate of the fuel when the second stage fuel is to be supplied and at the same time, step-wise reducing the same quantity of the fuel that is being supplied from the first stage fuel supply.

9 Claims, 10 Drawing Figures

METHOD OF SUPPLYING FUEL INTO GAS TURBINE COMBUSTOR

BACKGROUND OF THE INVENTION

This invention relates to a method of supplying a fuel into a gas turbine combustor, and more particularly, to a method of supplying a fuel into a two-stage combustion system gas turbine combustor of a low nitrogen oxide $NO_x$ to obtain an excellent combustion performance.

Since a combustion pressure and an inlet air temperature are high in a gas turbine combustor, the formation of $NO_x$ is generally greater than in boilers and heating furnaces, and hence reduction of $NO_x$ is an important problem to be solved as soon as possible.

$NO_x$ formed during the combustion process is affected by the combustion gas temperature, the oxygen partial pressure and the residence time of the gas, but among them, the influence of the combustion gas temperature is the greatest. It is therefore most effective to effect combustion at low temperature in order to reduce $NO_x$. A so-called "lean combustion method" has been developed for reducing $NO_x$ in the gas turbine combustor, which method supplies air in a quantity exceeding the stoichiometrical quantity into the combustor and effects low temperature combustion. However, since the gas turbine combustor has an extremely wide operation range from the start to the rated load, the degree of lean combustion has further increased at the time of partial load if the reduction of $NO_x$ is accomplished by effecting sufficiently lean combustion at the time of the rated load. This results in the problems such as inferior combustion, increase of unburnt components, inferior ignition at the time of ignition, and so forth. For this reason, the degree of lean combustion is greatly restricted. In the case of high temperature high pressure combustion such as in the gas turbine, because the combustion speed is very fast, if so-called "diffusion combustion", which separately supplies the fuel and the air into the combustor for combustion, is employed, a major amount of combustion take place at a stoichiometric mixture or at a fuel rich mixture even though over all fuel to air supply ratio is not stoichiometric so that hot spot develops and $NO_x$ can not drastically be reduced.

Various combustion systems and constructions of the combustors have been examined so as to solve these technical problems. A so-called "two stage combustion system", which supplies separately the fuel to the upstream side and downstream side of the combustor has been examined in order to solve the former problem. Since the hot spot can be eliminated by eliminating the locally existing fuel rich zone, pre-mixing combustion has been examined in order to solve the latter problem. This means that pre-mixing combustion is an essential condition in order to drastically reduce the $NO_x$ in the gas turbine combustor, and, in this case, a two or multi-stage combustion is necessary so as to obtain excellent combustion performance throughout the entire operation range of the gas turbine.

In, for example, Japanese Patent Laid Open Application No. 112933/1980, a conventional gas turbine low $NO_x$ combustors is proposed, wherein the section of the combustor is narrowed so as to define first and second stage combustion zones, and the fuel is individually supplied to the first and second stage combustion zones. Furthermore, the feed of the fuel to the first stage is once cut off at its intermediate portion, and the fuel is again charged in order to provide the first stage combustion zone with the function of pre-mixing combustion.

Another prior art method effects stable diffusion combustion at the first stage and forms a lean fuel-air premixture of a pipe type at the second stage.

These prior art methods can drastically reduce the level of $NO_x$ at the time of high load, and can improve ignition and low load performance to some extent; however, the crucial problem of these prior art methods is that combustibility is deteriorated when the fuel is supplied at the second stage. More particularly, at the beginning of the second stage fuel supply period, the discharge of unburnt or uncombusted components increases extremely, the combustion flame of the second stage is so unstable so as to generate an oscillation combustion with blow-out of the flame at times, and the flame of the second stage interferring with the flame of the first stage, thereby oscillating the combustor as a whole. These problems occur because the fuel-air mixture ratio of the second stage combustion is so low at the period of the beginning of the second stage fuel supply, that a sufficiently stable combustion can not be maintained, combustion of the second stage does not smoothly proceed and the discharge of the unburnt or uncombusted components as well as oscillation combustion develop.

These problems can be solved, in principle, by any of the following methods.

(1) The design value of the fuel-air ratio of the second stage is made large.

(2) A difference is generated in the fuel concentration for the second stage combustion.

(3) The flowing direction of the combustible fuel-air mixture is set so as to come into contact and mix with the high temperature gas of the first stage combustion flame.

However, these methods remarkably increase the $NO_x$ from the second stage combustion flame and adversely affect the advantage of the two-stage combustion. In other words, it is a crucial problem in such two-stage low $NO_x$ combustors solve the problem of the deterioration of combustion performance when the fuel is supplied at the second stage.

The aim underlying the present invention essentially resides in providing a method of supplying a fuel to a gas turbine combustor which can reduce the $NO_x$ level without spoiling any other combustion performance.

In accordance with the present invention, a method is proposed which includes supplying a fuel to a gas turbine combustor operated by burning the fuel of the first stage and the air within a range from the start of the gas turbine until its low output range, and being operated by burning the fuels of both first and second stage within high output range of the gas turbine including its maximum output, with a predetermined quantity of fuel, in a step-wise means, being supplied to the second stage while at the same time, the same quantity of the fuel to be supplied to the first stage is decreased in a stepwise manner.

The fuel supply quantity to the second stage is greater than the quantity necessary for the instantaneous ignition of the second stage fuel, and a weight to air quantity ratio of the second stage is preferably greater than 0.01. This arrangement can accomplish the complete combustion when the fuel supplied at second stage as well as improving the stability of the second stage and can also improve the stability of the second stage combustion.

The adjustment of output in the high output operation range of the gas turbine is preferably accomplished by increasing or decreasing the quantity of the first stage fuel. This arrangement can restrict the occurrence of the unburnt or uncombusted components within the high output operation range.

DETAILED DESCRIPTION

Figure 1:
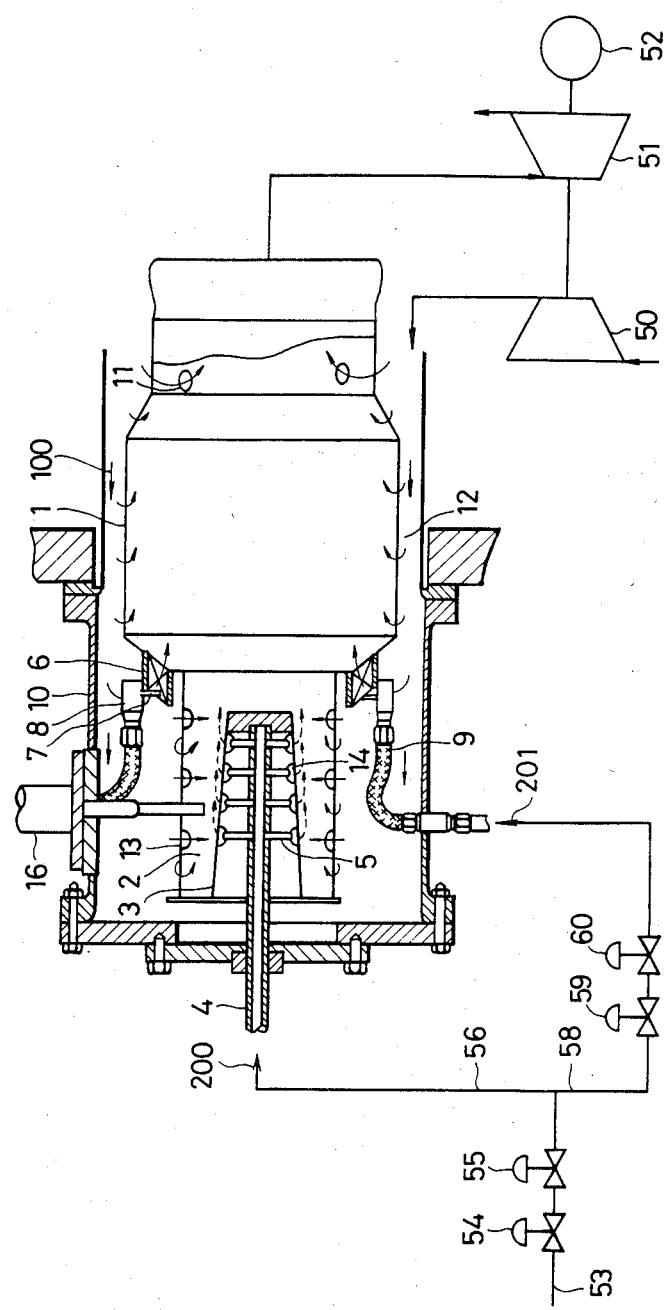
FIG. 1 is a sectional view of a typical two-stage combustion low $NO_x$ combustor.

Referring now to the drawings wherein like reference numerals are used throughout the various views to designate like parts and, more particularly, to FIG. 1, according to this figure, a two-stage low $NO_x$ combustor includes a sub-chamber 2 having a cross-sectional area smaller than that of a combustor liner 1, with the subchamber being disposed upstream of the combustor liner 1. A cylindrical cone 3, having a cross-sectional area progressively decreasing in the down stream direction, is disposed inside the sub-chamber 2 in the concentric arrangement with it. A first stage fuel supply pipe 4 and a fuel nozzle 5 are disposed inside the cylindrical cone 3, thereby defining a first stage combustion chamber. A whirler 6 for supplying the second stage combustion air, as a whirling flow, is disposed around the outer circumference of the conical portion at the rear end of the sub-chamber 2, and second stage fuel nozzles 8 are fitted between the whirl vanes of the whirler 6 via fuel headers 8, thereby defining the second stage combustion chamber. A fuel supply pipe 9 is provided for each second stage fuel nozzle 7.

A main fuel supply pipe 53 branches into first and second stage fuel supply pipes 56, 58, and the first and second stage fuels are supplied to the respective fuel nozzles 5, 7 from these fuel supplies pipes 56, 58 through first and second fuel supply sub-pipes 200, 201, respectively. A pressure regulation valve 54 and a flow rate regulation valve 55 are disposed in the main fuel supply pipe 53, and all the fuel flow rates are controlled by control signals from the gas turbine. A pressure regulation valve 59 and a flow rate regulation valve 60 are disposed in the second stage fuel flow rate, and are controlled, in the interlocking arrangement, with the pressure regulation valve 54 and flow rate regulation valve 55 of the main fuel, so that the first and second stage fuels are supplied while the ratio of their flow rates are controlled and the total flow rate is kept at a constant level.

In the gas turbine combustor described above, the air 100, boosted by a compressor 50, flowing between the outer cylinder 10 of the combustor and the combustor liner 1, passes through a dillution air hole 11 and liner wall cooling hole 12 that are bored on the combustor liner 1, through the whirler 6 operating also as the second stage air inlet port, and through a first stage air hole 13 bored on the outer wall of the sub-chamber 2, and flows into the combustor liner 1. The first stage fuel 200 is supplied from a fuel injection port 14 disposed on the inner wall of the cylindrical cone 3 via the first stage fuel nozzle 5 at the time of ignition of the gas turbine, and the fuel is ignited by electric spark from a spark plug 16 and is burnt or combusted. The combustor is operated by only this first stage combustion until the partial load of the gas turbine 51 connected to a load 52. The high output operation of the gas turbine 51 is carried out by supplying the second stage fuel 201 into the whirler 6 from the second stage fuel nozzle 7, and igniting and burning automatically the combustible fuel-air mixture formed in the whirler 6 by contact with the first stage combustion flame.

Next, the principle of low $NO_x$ combustion by this combustor will be described. First of all, in the first stage combustion, the first stage fuel 200 is supplied from the peripheral wall of the cylindrical cone 3 so as to rapidly accomplish its mixing with the combustion air supplied from the peripheral wall of the sub-chamber 2. Since combustion is effected in the range of the high fuel concentration that is formed by a part of the fuel in the proximity of the peripheral wall of the cylindrical cone 3, the lean air low temperature combustion is effected as a whole and $NO_x$ is reduced at the first stage.

The second stage combustion is directed so that the second stage fuel 201 is supplied into the whirler 6 so as to pre-mix the fuel and the air inside the whirler 6, and the resulting pre-mixture is supplied so as to realize uniform low temperature combustion devoid of any hot spot and to reduce $NO_x$.

The ratio of the flow rates of the first and second fuels and the fuel-air ratios for the first and second stage combustion during the rated turbine operation as the fundamental combustion design of the two-stage combustion low $NO_x$ combustor vary not only of course with the structure of the combustor, but also with the operating conditions of the gas turbine to which the combustor is directed, the $NO_x$ target value, and the kind of fuels. However, very fundamental design concept would be one in which the first stage combustion covers up to about 50% load of the gas turbine, and the second stage combustion covers the range from the 50% load to the rated load, because each stage covers the half of the combustion range, and the range of each operation fuel-air ratio is substantially reduced by one-half without causing any forced combustion.

In order to obtain the balance of the excellent combustion performance with low $NO_x$, it is necessary that the fuel-air mixture ratio of each of the first and second fuels be within the range of from 0.02 to 0.05. Particularly because the second stage fuel is pre-mixed with the air and burnt or combusted, however, the stable combustion range is less than that of the first stage combustion range, and more excellent combustion performance could be obtained if the fuel-air ratio is at least about 0.03 at the start of the second stage combustion.

Figure 2:
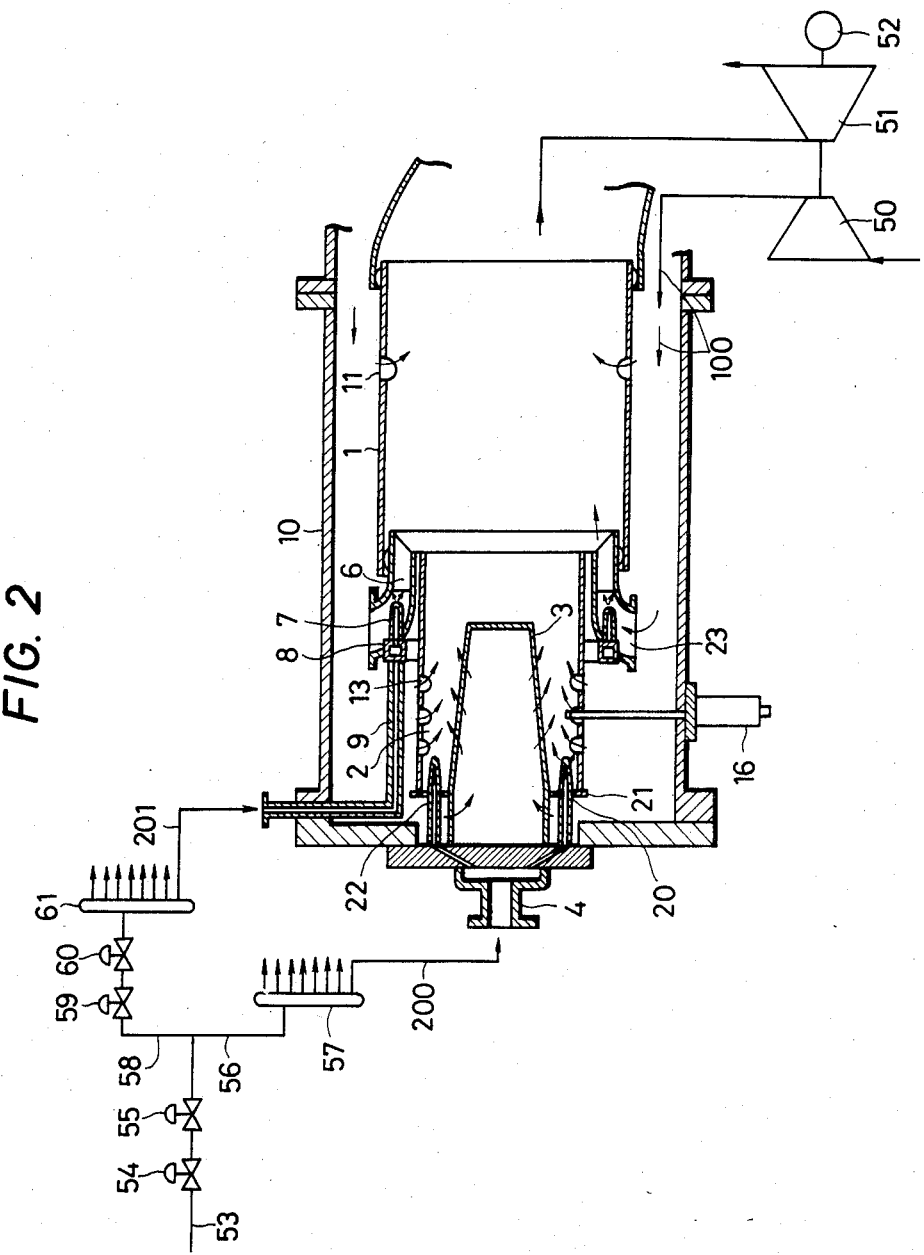
FIG. 2 is a sectional view of another two-stage combustion low $NO_x$ combustor constructed in accordance with the present invention.

In FIG. 2, an end cover 21 having a plurality of openings 20, is disposed upstream of the sub-chamber 2 in such a manner as to cover the annular portion of the inner cylindrical cone 3, and the fuel nozzles 22 of the first stage are disposed so as to transversely cross the openings 20 of the end cover 21, to project into the combustion chamber, and thus define the first stage combustion chamber. A second stage combustion air passage 23 for supplying the second stage combustion air, which is separated from other air openings, is defined to open on the outer circumference at the rear end of the sub-chamber 2, and a plurality of whirl vanes 6 are fitted to the openings. The second stage fuel nozzle 7 is fitted at substantially the mid portion of each whirl vanes 6 in the proximity of the upstream end of the vane 6, and the upstream end of the nozzle is connected to the second stage fuel supply pipe 9 via the second stage fuel header 8. The second stage combustion is formed by supplying the fuel-air mixture at the down-stream portion of the first stage combustion chamber 2.

Though not shown in the drawing, wall cooling holes are formed on the walls of the combustor liner 1 and sub-chamber 2 for introducing the cooling air so that the wall temperature is adjusted below the permissible temperature of the material used. Fuel distributors 57, 61 are disposed in such a manner as to uniformly supply the fuel to the combustors that are juxtaposed with each other. The first stage fuel 200 is supplied or dispursed as a fuel jet stream into the first stage combustion chamber defined annularly by the sub-chamber 2 and the cylindrical cone 3 from a plurality of fuel nozzles 22. Each flame of the first stage combustion is stabilized by a re-circulating flow that is formed in the proximity of the end cover 21 around the projecting portion of each fuel nozzle 22. Since the fuel is dispersed and supplied into the combustion air as described already, rapid mixing of the fuel with the air becomes possible effectively, and the fuel is burnt or combusted with low $NO_x$.

Figure 3:
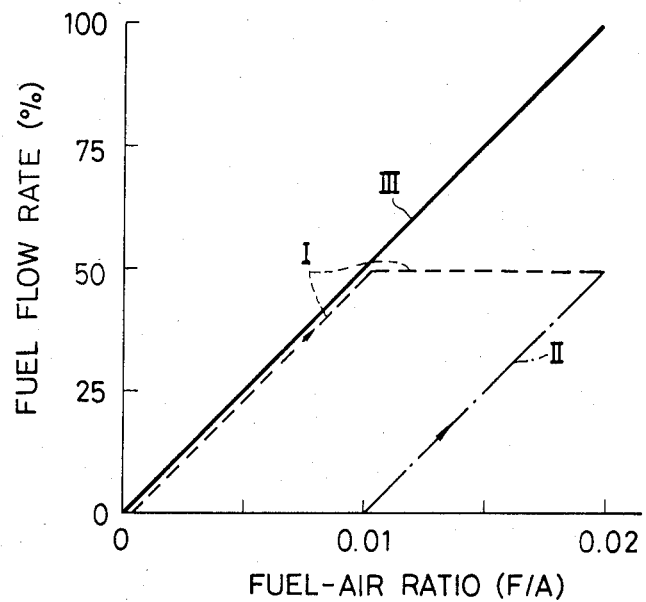
FIG. 3 is a graphical illustration of a conventional method of supplying the fuel.

FIG. 3 provides a graphical illustration of a fuel charge plan for the first and second stages in accordance with the prior art system for a gas turbine (with an air-fuel ratio of about 0.02 at the rating) when the turbine inlet temperature is about 1,100° C. The operation is carried out by supplying only the first stage fuel I to effect the first stage combustion within the range starting from the ignition to the overall fuel-air rate of 0.01, and thereafter the supply quantity of the second stage fuel II is gradually increased. The sum of the first and second stage fuels I and II is the overall fuel III.

Figure 4:
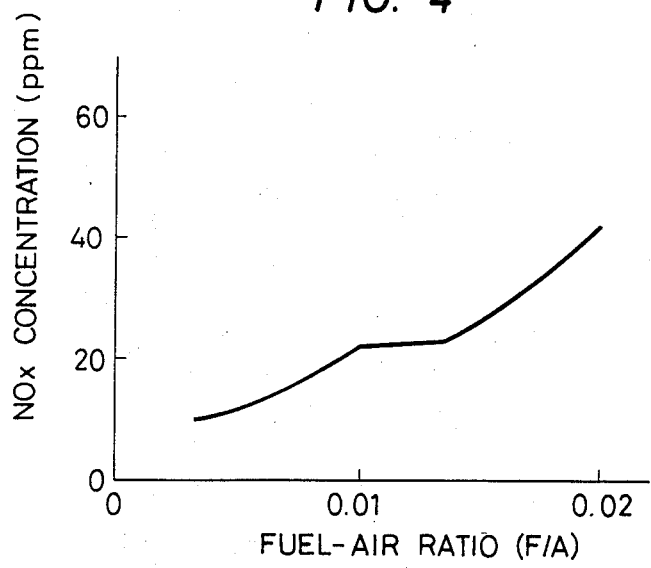
FIG. 4 is a graphical illustration of the $NO_x$ concentration characteristics in the prior art.
Figure 5:
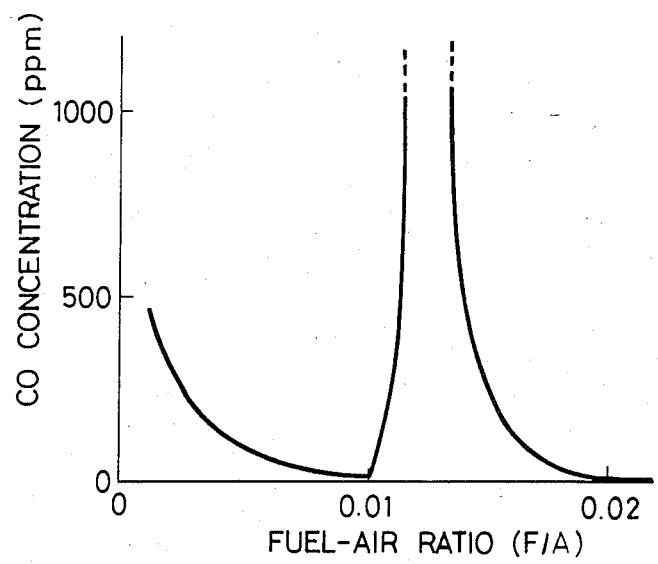
FIG. 5 is a graphical illustration of the CO concentration characteristics in the prior art.

As shown in FIGS. 4 and 5, CO increases remarkably from the start of charge of the second stage fuel II (F/A=0.01) until the portion at which F/A is close to 0.014, and in the interim, the second stage fuel is incompletely burnt or uncombusted. This is because the fuel becomes excessively lean as described, and this is the crucial problem with the two-stage combustion low $NO_x$ combustor.

Figure 6:
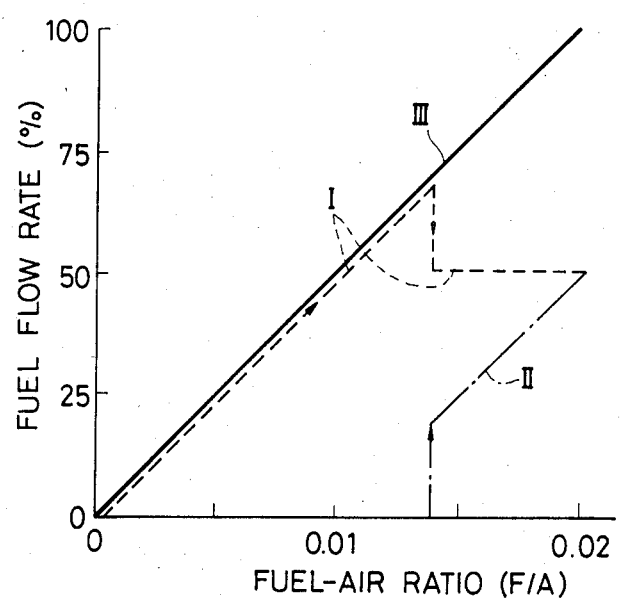
FIG. 6 is a graphical illustration of an example of the method of supplying a fuel in accordance with the present invention.

In accordance with the embodiment of FIG. 6 the supply of the second stage fuel II in a certain predetermined quantity is step-wise and at the same time, the first stage fuel I in the same predetermined quantity is decreased step-wise. In other words, the incomplete combustion zone due to the excessively lean second stage combustion is instantaneously passed by charging step-wise the second stage fuel II in order to shift it to the stable combustion zone, to restrict an extreme increase of the unburnt or uncombusted components and thus to eliminate unstable combustion. After the second stage fuel is charged, the supply of the first stage fuel I is made constant while the second stage fuel II is increased in order to carry out the operation until the rated load.

Figure 7:
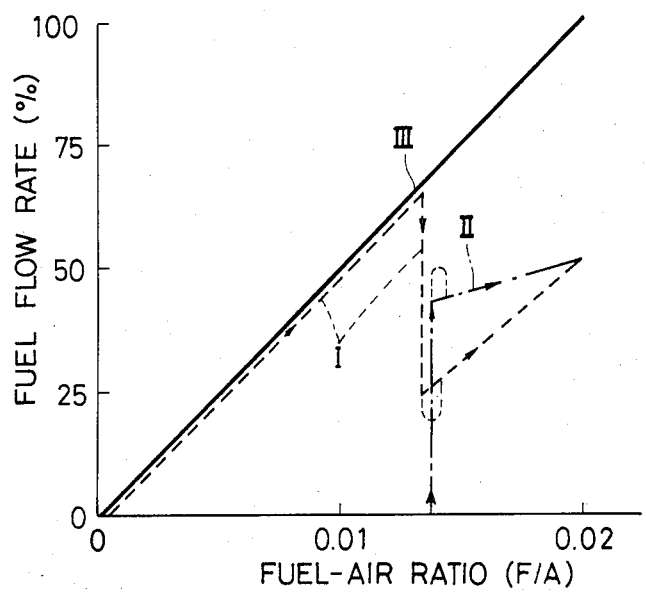
FIG. 7 is a graphical illustration of another example of the method of supplying a fuel in accordance with the present invention when the gas turbine load rises.

In FIG. 7, the fuel quantity to be charged step-wise at the time of the second stage fuel II is set to a value close to the rated value of the second stage combustion. Therefore, the supply quantity of the first stage operation is carried out with a low output. In this case, the combustion performance will drop if the fuel-air ratio of the first stage is drastically below 0.02. Thereafter, the second stage fuel II is gradually increased while the first stage fuel I is increased considerably drastically.

Figure 8:
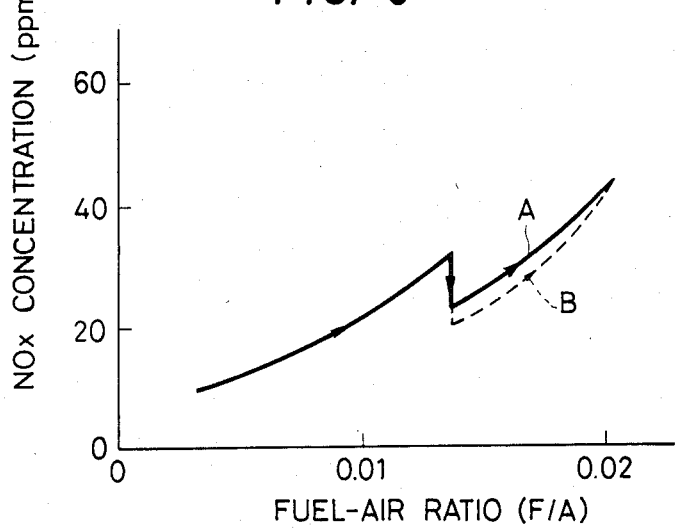
FIG. 8 is a graphical illustration of the $NO_x$ concentration characteristics in the present invention.
Figure 9:
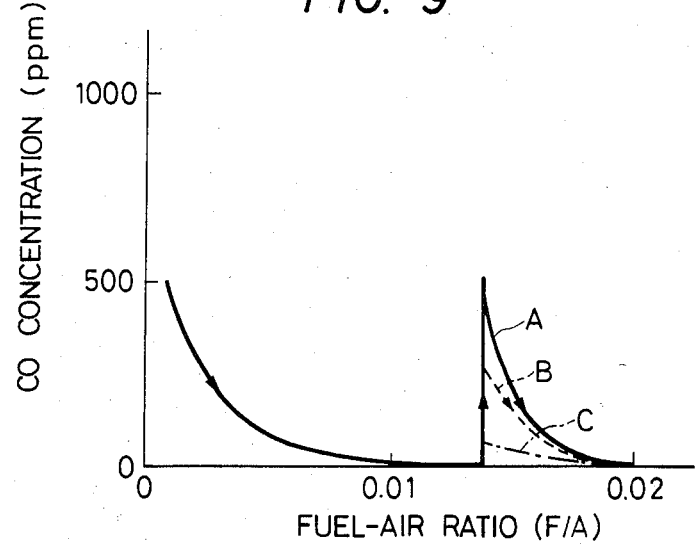
FIG. 9 is a graphical illustration of the CO concentration characteristics in the present invention.
Figure 10:
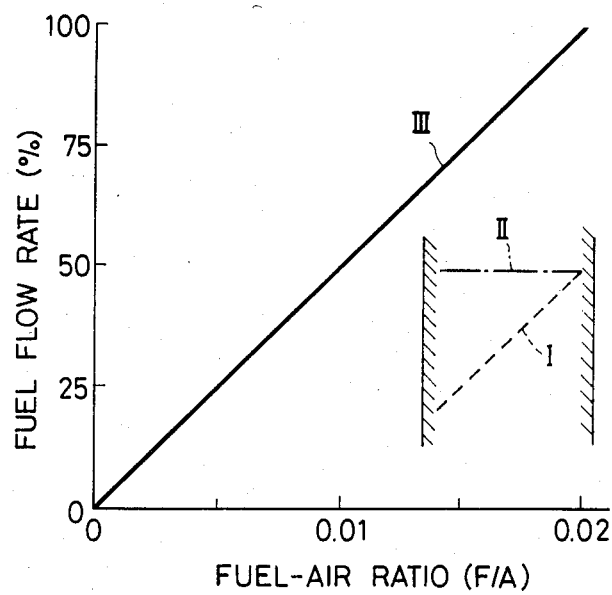
FIG. 10 is a graphical illustration of the method of supplying a fuel in the high output operation range of the gas turbine.

In FIGS. 8 and 9, the symbol A represents the characteristics when the fuel is supplied into the combustor shown in FIG. 1 by the method shown in FIG. 6, and symbol B represents those when the fuel is supplied into the combustor shown in FIG. 2 by the method shown in FIG. 7.

The second stage combustion is initiated by charging the second stage fuel, and the fuel-air ratio of the first stage combustion drops. Consequently, $NO_x$ drops step-wise. On the other hand, CO increases step-wise because CO is generated by the second stage combustion. However, the peak value of the CO level does not rise to a concentration as high as some thousand of ppm as in the prior art, and, moreover, it becomes possible to limit the high CO concentration zone to an extremely narrow range. The necessary flow rate of the second stage fuel to be charged step-wise when starting to charge the second stage fuel varies with the design of the combustor, the permissible value of the $NO_x$ and unburnt or uncombusted components, and the like. However, the result of studies of the combustion data such as the combustible fuel-air ratio ranges of hydrocarbon fuels that can be used as the fuel for the gas turbine, the flame propagation speed and the CO combustion speed in conjunction with various structures of the combustors reveal that excellent ignition and combustibility of the second stage combustion can be exhibited when the ratio of the second stage fuel flow rate to be charged step-wise to the air quantity for the second stage combustion is at least 0.01. If this fuel-air ratio is below 0.01, it is difficult for instantaneous ignition of the second stage fuel to occur, and the unburnt or uncombusted components increase so much that, at times, oscillation combustion will occur. In FIG. 6, in which the operation is carried out while keeping maintaining the first stage fuel constant after the charge of the second stage fuel, the operation range of the second stage combustion will be limited if the fuel-air ratio is increased, and this results in the disadvantages of reducing $NO_x$ and for keeping the flexibility of operation; therefore, the upper limit of the fuel-air ratio is about 0.04.

It has been found that ignition of the second stage combustion can be improved by excessively instantaneously charging the second stage fuel II to be charged step-wise than the plan value and reducing, on the contrary, the first stage fuel I in match with the increment of the second stage fuel II, as represented by oblique line in FIG. 7.

Since the fuel supply method from the ignition until the low load operation of the gas turbine has been described above, the method of adjusting the output of the gas turbine in its high load operation range will now be described. FIG. 8 shows the fuel supply method in the high load operation range. While the second stage fuel II is maintained substantially constant, the gas turbine output is changed by increasing or decreasing the quantity of the first stage fuel I. This method utilizes the fact that the CO characteristics of the first stage combustion exhibits a combustion pattern approximate to that of diffusion combustion, and the residence time of the gas for burning the unburnt components is long.

The unburnt or uncombusted components, during the load operation of the gas turbine, can be minimized by adjusting the load of the gas turbine by controlling the fuel in the manner described above. The CO concentration characteristics in this case are represented by symbol C in FIG. 9.

The arrangement described above can restrict the occurrence of the unburnt components when the second stage fuel is charged, and can also improve the stability of the second stage combustion. Moreover, lean combustion of the second stage combustion can be improved, and $NO_x$ can be advantageously improved extremely. The occurrence of the unburnt or uncombusted components in the high output operation range can also be limited.

What is claimed is:

1. A method for supplying a fuel for a gas turbine combustor of the type which introduces high pressure air and a fuel thereinto and combusts the fuel and air to generate a high temperature turbine operating gas, and which includes a first stage combustion chamber having a first stage fuel supply means and an air supply means each disposed upstream of said combustor, and a second stage combustion chamber having a second stage fuel supply means and an air supply means each disposed downstream of said first stage fuel supply means, the method comprising the steps of supplying the fuel only from said first stage fuel supply means to only operate said first stage combustion chamber from the start of operation of said gas turbine until the gas turbine combustor is in a low output range; and supplying in a step change such that a fuel flow rate changes more rapidly than in normal load control the fuel from said second stage fuel supply means to be at a predetermined flow rate and at the same time, decreasing in the step change substantially the same quantity of the fuel, that is being supplied from said first fuel supply means, when the second stage fuel is to be supplied and wherein the second stage fuel to be supplied in a step change into the second combustion chamber is excessively charged above a predetermined value for a short period of time and, at the same time, the first stage fuel to be decreased in the step change is excessively reduced below a predetermined value.

2. The method of claim 1, wherein the flow rate of the fuel supplyied from said second fuel supply means when the second stage fuel is to be supplied is such that the weight ratio of the flow rate of the fuel to be supplied from the second fuel supply means to the quantity of the combustion air to be supplied from said second stage air supply is at least 0.01.

3. The method of claim 2, wherein the weight ratio of the flow rate of the fuel to be supplied from said second stage fuel supply means to the quantity of combustion air to be supplied from said second stage air supply means is up to 0.04.

4. The method of claim 1, wherein the flow rate of the fuel to be supplied from said second stage fuel supply means when the second stage fuel is to be supplied is at least 50% of the flow rate of the fuel that is supplied from said first stage fuel supply means before the second stage fuel is supplied.

5. The method of claim 1, wherein an output of said gas turbine in the high output operation is substantially carried out by adjusting the flow rate of the fuel supplied from said first stage fuel supply means.

6. A method of supplying fuel for a gas turbine combustor of the type which introduces high pressure air and fuel therein and burns the air and fuel to generate a high temperature turbine operating gas, and which includes a first stage combustion chamber having first stage fuel supply means and air supply means each of which are disposed upstream of said combustor, and a second stage combustion chamber having second stage fuel supply means and air supply means each disposed downstream of said first stage fuel supply means, the method comprising the steps of: supplying the fuel only from said first stage fuel supply means to operate only said first stage combustion chamber from a beginning of operation of said gas turbine until a low output range is attained; supplying, in a step change of the second fuel flow rate, the fuel from said second stage fuel supply means into said second stage combustion chamber to be a flow rate in excess of a predetermined value at which a stable combustion is effected with a small production of $NO_x$ while, at the same time, as the supply of second stage fuel, reducing the first stage fuel to be supplied into said first stage combustion chamber by substantially the same quantity of fuel as the second stage fuel supplied; reducing, after a short period of time following the second stage fuel supply, the second stage fuel supply to flow at the predetermined flow rate value, while, at the same time, increasing the second stage fuel by substantially the same quantity of the first stage fuel as the second stage fuel reduced to the predetermined flow rate value; and supplying both the first and second stage fuel according to the load whereby said first and second stage combustors are operated.

7. The method as defined in claim 6, wherein in said step of supplying, in a step change of a second stage fuel flow rate, the second stage fuel is supplied at a fuel flow rate change which is larger than a change in the flow rate of the fuel supply for a normal load control of the turbine.

8. The method as defined in claim 7, wherein said step change in the second flow rate at ignition of the second stage fuel is such that the second stage fuel is supplied to reach a fuel flow rate in excess of the predetermined value before substantial load change is effected by the second stage fuel supply.

9. The method as defined in claim 8, wherein said second stage fuel is supplied at a fuel-air ratio of more than 0.01.

* * * * *